(12) United States Patent
Blackman

(10) Patent No.: US 7,388,298 B2
(45) Date of Patent: Jun. 17, 2008

(54) RETROFITTABLE POWER DISTRIBUTION SYSTEM FOR A HOUSEHOLD

(76) Inventor: Tracy Blackman, 684 Red Fern Rd., Havana, FL (US) 32333

( * ) Notice: Subject to any disclaimer, the term of this patent is extended or adjusted under 35 U.S.C. 154(b) by 35 days.

(21) Appl. No.: 11/654,936

(22) Filed: Jan. 18, 2007

(65) Prior Publication Data
US 2007/0296222 A1  Dec. 27, 2007

Related U.S. Application Data

(63) Continuation-in-part of application No. 11/472,041, filed on Jun. 21, 2006.

(51) Int. Cl.
*F01C 13/00* (2006.01)
*F02P 6/00* (2006.01)
*H02P 9/04* (2006.01)
*F02N 11/00* (2006.01)

(52) U.S. Cl. .................. 290/1 A; 290/38 R; 290/4 R

(58) Field of Classification Search ............... 290/1 A, 290/2, 1 R, 4 R, 38 R; 307/64
See application file for complete search history.

(56) References Cited

U.S. PATENT DOCUMENTS

| | | | |
|---|---|---|---|
| 2,302,192 A * | 11/1942 | Dannheiser .................. 307/64 |
| 3,141,096 A * | 7/1964 | Singelmann ................ 290/4 R |
| 3,805,139 A | 4/1974 | Hoffman et al. |
| 3,992,885 A * | 11/1976 | Forster ......................... 60/698 |
| 4,366,390 A | 12/1982 | Rathmann |
| 4,797,566 A | 1/1989 | Nozaki et al. |
| 5,221,862 A | 6/1993 | Fiorina et al. |
| 5,296,799 A * | 3/1994 | Davis ........................... 322/35 |
| 5,422,518 A | 6/1995 | Sashida |
| 5,747,887 A | 5/1998 | Takanaga |
| 6,177,738 B1 * | 1/2001 | Hentunen et al. ............. 307/67 |
| 6,522,024 B1 * | 2/2003 | Takaoka et al. .......... 290/40 C |
| 6,522,031 B2 | 2/2003 | Provanzana et al. |
| 6,900,556 B2 | 5/2005 | Provanzana et al. |
| 6,987,369 B1 * | 1/2006 | Franks, II .................... 318/153 |
| 7,095,126 B2 * | 8/2006 | McQueen .................... 290/1 A |
| 7,245,035 B2 * | 7/2007 | Anzioso et al. ................ 290/2 |
| 2002/0041126 A1 | 4/2002 | Provanzana et al. |
| 2002/0101119 A1 * | 8/2002 | Eisenhaure et al. ........... 307/64 |
| 2003/0047209 A1 | 3/2003 | Yanai et al. |
| 2007/0120366 A1 * | 5/2007 | Grant et al. ................. 290/1 A |
| 2007/0276556 A1 * | 11/2007 | Noel et al. .................... 701/22 |
| 2007/0296276 A1 * | 12/2007 | Blackman .................... 307/64 |

FOREIGN PATENT DOCUMENTS

WO    WO 2008/010734 A2 *  1/2008

* cited by examiner

*Primary Examiner*—Julio Gonzalez

(57) ABSTRACT

A power distribution system for retrofitting to a household or other building. The power distribution system includes a means for supplying energy to the power distribution system for an indeterminate period of time. The power distribution system further comprises a means for converting the energy supplied to the power distribution system into motion. A generator is operatively connected to the energy converting means and converts the motion produced by the energy converting means into an electric current. The electric current produced by the generator is used to power a high-load circuit. An alternator is also operatively connected to the energy converting means. The alternator is configured to convert the motion produced by the energy converting means into another electric current. The alternator transmits this electric current to a bank of batteries which stores the charge. An inverter is electrically connected to the bank of batteries and transmits an electric current from the bank of batteries to a low-load circuit.

36 Claims, 9 Drawing Sheets

RETROFITTABLE POWER DISTRIBUTION SYSTEM FOR A HOUSEHOLD

CROSS-REFERENCES TO RELATED APPLICATIONS

This is a continuation-in-part of U.S. Ser. No. 11/472,041 filed may 21, 2006 which is currently pending and names the same inventor.

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of household power distribution systems. More specifically, this invention comprises a retrofittable power distribution system for delivering power to a household or other building via high-load and low-load power circuits.

2. Description of the Related Art

Various power distribution systems exist for household applications. Most households obtain power from a common electrical power grid as a primary power source. Some of the other power systems serve as a back-up power supply for the household when the household's primary power source is not functional. Most back-up power supply systems are stand-alone systems which operate independently of the household's primary power source. Gas-powered generators are the most common back-up power supply systems. Gas-powered generators are generally activated manually when a household loses power provided by the primary power system.

In addition, some power systems are auxiliary systems to assist the household's primary power source. Some households obtain power from "renewable" sources to supplement power received from the household's primary power source. As an example, some households obtain power or energy from solar or geothermal sources in addition to using power from the common electrical power grid. Although these alternative sources may also be used as a back-up power supply, households which utilize these alternative power sources often draw power from these alternative sources on a continuous basis.

Although many power systems exist for serving various household power and energy needs, there remains a need for a retrofittable power system that can serve both continuous operating and back-up power needs. It is therefore desirable to provide a retrofitted power distribution system which can provide power to a household for both back-up and continuous operation needs.

BRIEF SUMMARY OF THE INVENTION

The present invention is a power distribution system for retrofitting to a household or other building. The power distribution system includes a means for supplying energy to the power distribution system for an indeterminate period of time. The power distribution system further comprises a means for converting the energy supplied to the power distribution system into motion. A generator is operatively connected to the energy converting means and converts the motion produced by the energy converting means into an electric current. The electric current produced by the generator is used to power a high-load circuit.

An alternator is also operatively connected to the energy converting means. The alternator is configured to convert the motion produced by the energy converting means into electric current in a separate circuit. The alternator transmits this electric current to a bank of storage batteries. An inverter is electrically connected to the bank of batteries and transmits an electric current from the bank of batteries to a low-load circuit. As such, the present invention acts as an energy storage system.

Various energy converting means which are capable of converting energy to motion may be employed in the present invention. In one example, an electric motor is connected to the household's electrical power source. The generator and alternator may both be coupled to the main pulley of the motor. In another example, a boiler and steam engine may be used to rotate an output shaft. The alternator and generator may be connected to pulleys on the output shaft. In yet another example, the alternator and generator are coupled to the main pulley of an internal combustion engine running on natural gas. The gas-combustion engine receives its fuel supply from a gas feed line integrated with the household. The reader should note that propane, diesel, or other fuel sources may also be used. Accordingly, a gas tank or cylinder may also be used to supply fuel to the gas-combustion engine.

The high-load circuit includes high-wattage household loads such as the household's air conditioner and low-wattage household appliances. The generator is configured to supply high current 110 volt or high current 220 volt power. The low-load circuit includes low-wattage household loads such as televisions, satellite receivers, computers, and lighting. The battery bank runs a DC to AC inverter producing 110 VAC. This is relatively "clean" low wattage AC power which is suitable for the aforementioned low-wattage household loads.

The power distribution system may be controlled by a main switch. The user turns on the main switch when high-load appliances are being used. The user turns off the main switch when only low-wattage loads are being used. The main switch may further be integrated with the HVAC thermostat so that the energy converting means is activated when air conditioning or heating is needed.

Figure 1:
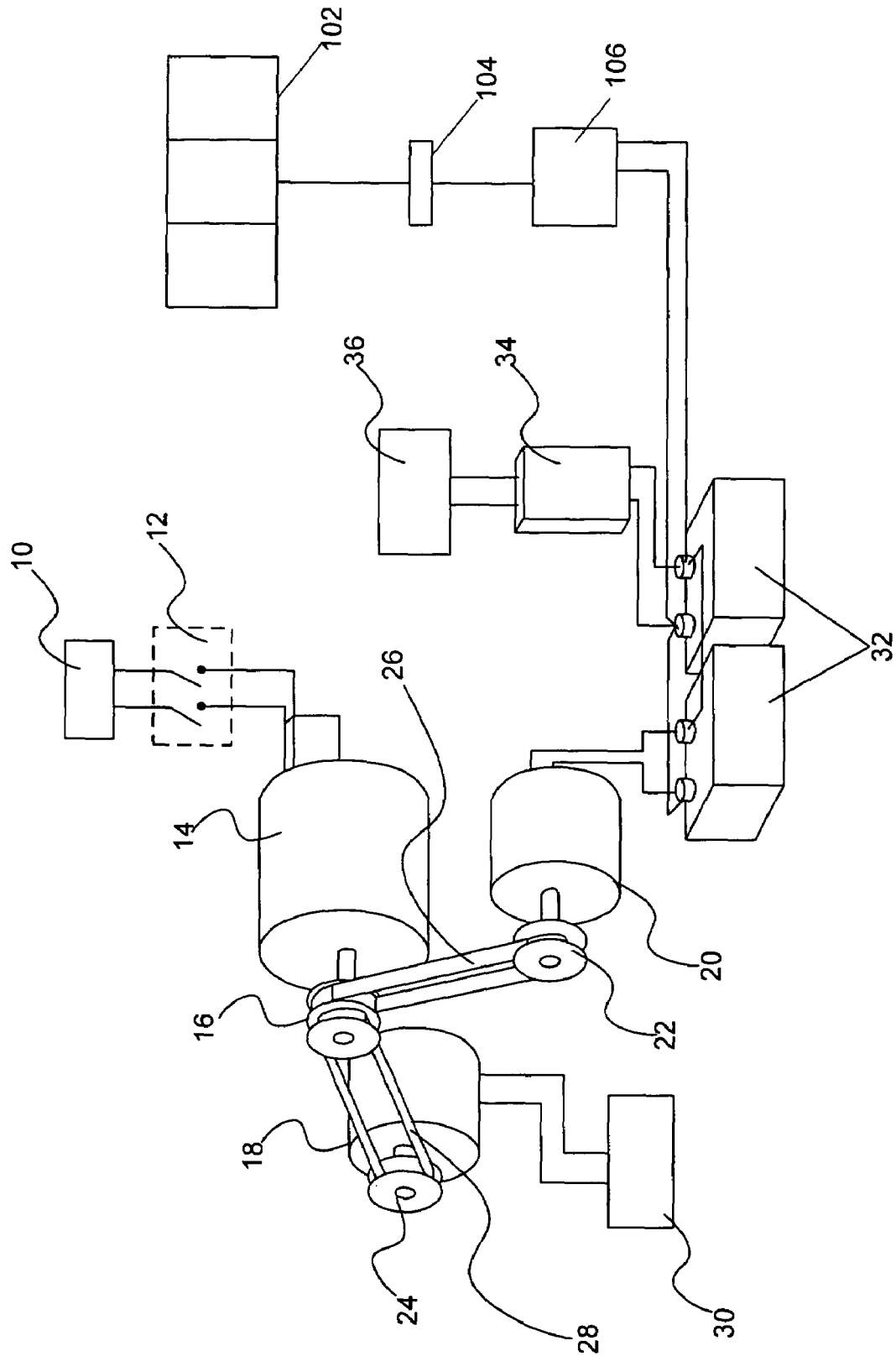
FIG. 1 is a perspective view, showing the present invention.

REFERENCE NUMERALS IN THE DRAWINGS 10 electrical power source 12 switch
14 electric motor 16 main pulley
18 generator 20 alternator
22 pulley 24 pulley
26 belt 28 belt
30 high-load circuit 32 batteries
34 inverter 36 low-load circuit
38 water heater 40 boiler
42 conduit 44 steam engine
46 output shaft 48 gas engine
50 gas feed line 52 exhaust
54 solar collectors 56 solar storage tank
58 back-up preheater 60 pump
62 pump 64 alternator
66 generator 68 batteries
70 inverter 72 switch
74 low load circuit 76 high load circuit
78 heated water circuit 80 control valve
82 water supply 84 switch
86 generator 88 distribution panel
90 automatic transfer switch 92 high load transfer switch
94 distribution panel 96 high load transfer switch
98 electric motor 100 low load transfer switch
102 solar panel 104 fuse breaker
106 charge controller 108 generator
110 power distribution system 112 gas engine
114 alternator 116 generator
118 belt 120 inverter
122 DC control panel 124 jumper cable box
126 air compressor 128 batteries
130 cord reel 132 cord reel
134 solar panel 136 level adjuster
138 frame 140 wheels
142 magneto 144 cigarette lighter
146 charge controller 148 voltage regulator sensor
150 remote starter 152 timer
154 automatic transfer switch 156 voltage regulator sensor
158 starter 160 fuel tank

DETAILED DESCRIPTION OF THE INVENTION

The present invention, a power distribution system for retrofitting to a household or other building, is illustrated in FIG. 1. The power distribution system includes a means for supplying energy to the power distribution system for an indeterminate period of time. In the current example, the power distribution system receives electrical power from electrical power source 10. Electrical power source 10 may be the household's primary electrical power source. For example, the household owner may use the main power input to the household's primary electrical load center as an input to the power distribution system.

The power distribution system further comprises a means for converting the energy supplied to the power distribution system into motion. Various energy converting means capable of converting energy to motion may be employed in the present invention. In the example illustrated in FIG. 1, electric motor 14 is used to convert electrical energy into rotational motion of an output shaft. Main pulley 16 is attached to the output shaft of electric motor 14 and rotates along with the output shaft.

Generator 18 is operatively connected to main pulley 16 and converts the motion produced by the electric motor 14 into an electric current. Belt 28 connects pulley 24 of generator 18 to main pulley 16 so that pulley 24 rotates along with main pulley 16. The electric current produced by generator 18 is used to power high-load circuit 30. High-load circuit 30 includes high-wattage household loads such as the household's air conditioner and low-load appliances. Generator 18 is configured to supply high current 110 volt or high current 220 volt power. This is an alternating current circuit.

Alternator 20 is also operatively connected to electric motor 14. Alternator 20 is configured to convert the motion produced by electric motor 14 into another electric current. This is a direct current circuit. Belt 26 connects pulley 22 of alternator 20 to main pulley 16 so that pulley 22 rotates along with main pulley 16. Alternator 20 (which may also be a magneto or an AC charger) transmits this direct electric current to a bank of batteries 32 which stores the charge. Inverter 34 is electrically connected to the bank of batteries 32 and transmits an electric current from the bank of batteries 32 to low-load circuit 36. It should be noted that energy storage devices other than batteries may similarly be used. The low-load circuit includes low-wattage household loads such as televisions, satellite receivers, computers, and lighting. The bank of batteries 32 runs a direct current to inverter 34 which converts the DC input to 110 VAC. This is relatively "clean" low wattage AC power which is suitable for the aforementioned low-wattage household loads.

The power distribution system may be controlled by a main switch, illustrated by switch 12. The user turns on the main switch when high-load appliances are being used. The user turns off the main switch when only low-wattage loads are being used. The main switch may further be integrated with the HVAC thermostat so that electric motor 14 is activated when air conditioning or heating is needed. Also, the system stores power from the main power source for later use. This allows the user to have the option of storing power during off-peak rate hours, like the middle of the night. Obviously, the system illustrated in FIG. 1 would store energy anytime the high-load circuit is in use.

It should be noted that the present design allows for the use of relatively inexpensive, off-the-shelf components. For example, a 200 A automotive alternator, 3 hp electric motor, and pulley drive system is typically less expensive than a comparable 200 A AC to DC charger.

Figure 2:
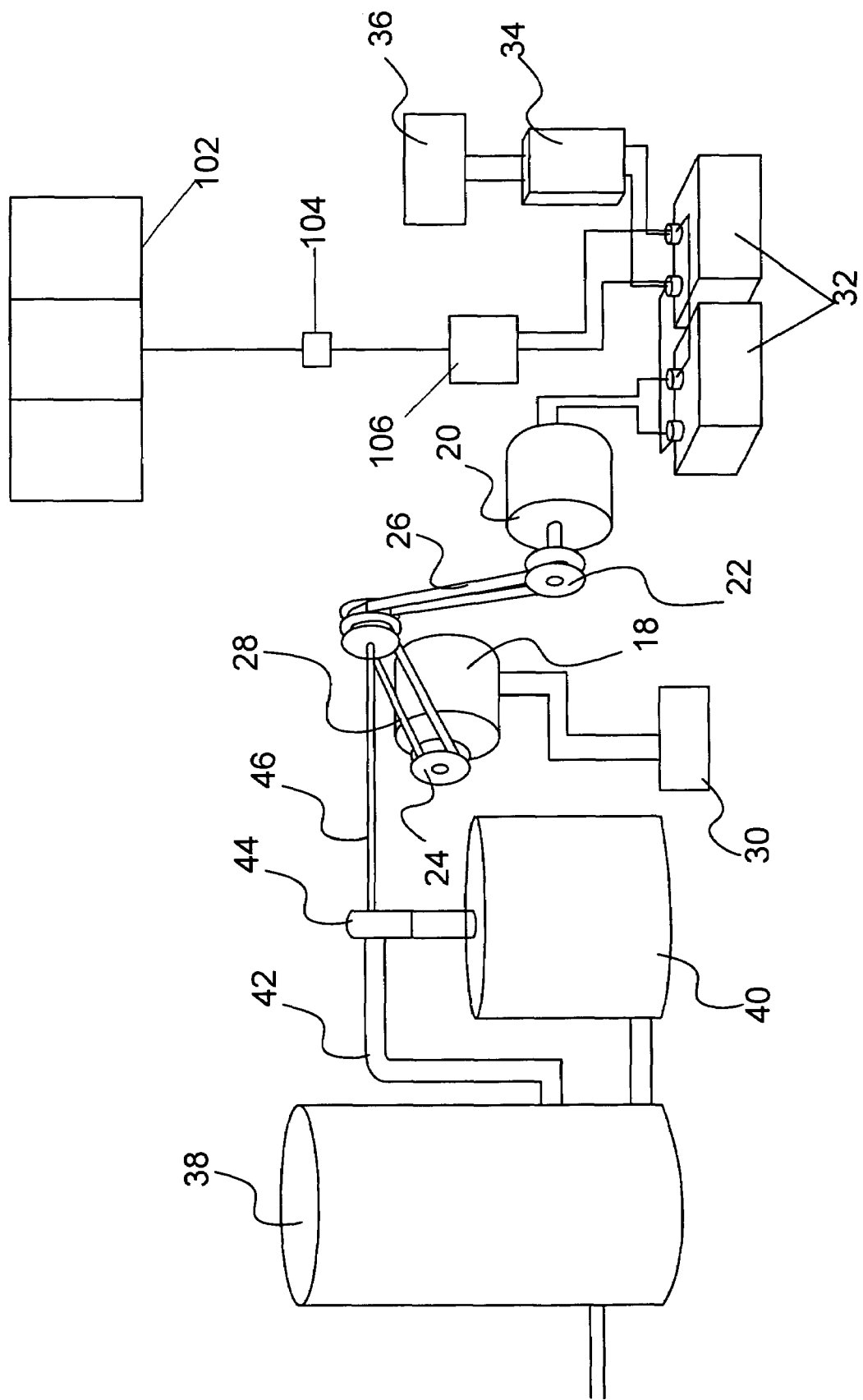
FIG. 2 is a perspective view, showing an alternate embodiment of the present invention.

Another embodiment of the present invention is illustrated in FIG. 2. Boiler 40 is fluidly connected to the household's water heater 38. Boiler 40 produces steam which powers steam engine 44. Boiler 40 may be electric or gas powered. The kinetic energy of steam produced by boiler 40 is converted to rotary motion by steam engine 44. Although a steam turbine type steam engine is illustrated in FIG. 2, many different types of steam engines may be used for steam engine 44. Rotation of the turbine in steam engine 44 causes rotation of output shaft 46 and pulleys attached to output shaft 46. Conduit 42 is provided for recirculation of steam to boiler 40.

Similar to the embodiment illustrated in FIG. 1, generator 18 is operatively connected to a pulley on output shaft 46 and converts the motion produced by steam engine 44 into an electric current. Belt 28 connects pulley 24 of generator 18 to the pulley on output shaft 46 so that pulley 24 rotates along with the pulley. Although not illustrated in the present drawing view, a simple transmission system or gearbox may be used to match the rotational speed of output shaft 46 to the design requirements of generator 18. The electric current produced by generator 18 is used to power high-load circuit 30. As in the previous embodiment, high-load circuit 30 includes high-wattage household loads such as the household's air conditioner and low-load appliances. Generator 18 is configured to supply high current 110 volt or high current 220 volt power.

Alternator 20 is also operatively connected to steam engine 44. Alternator 20 is configured to convert the motion produced by steam engine 44 into another electric current. Belt 26 connects pulley 22 of alternator 20 to a pulley on output shaft 46 so that pulley 22 rotates along with the pulley. Alternator 20 transmits this electric current to a bank of batteries 32 which stores the charge. Inverter 34 is electrically connected to the bank of batteries 32 and transmits an electric current from the bank of batteries 32 to low-load circuit 36. As in the previous embodiment, low-load circuit 36 includes low-wattage household loads such as televisions, satellite receivers, computers, and lighting. The bank of batteries 32 runs a direct current to inverter 34 producing 110 VAC.

Figure 3:
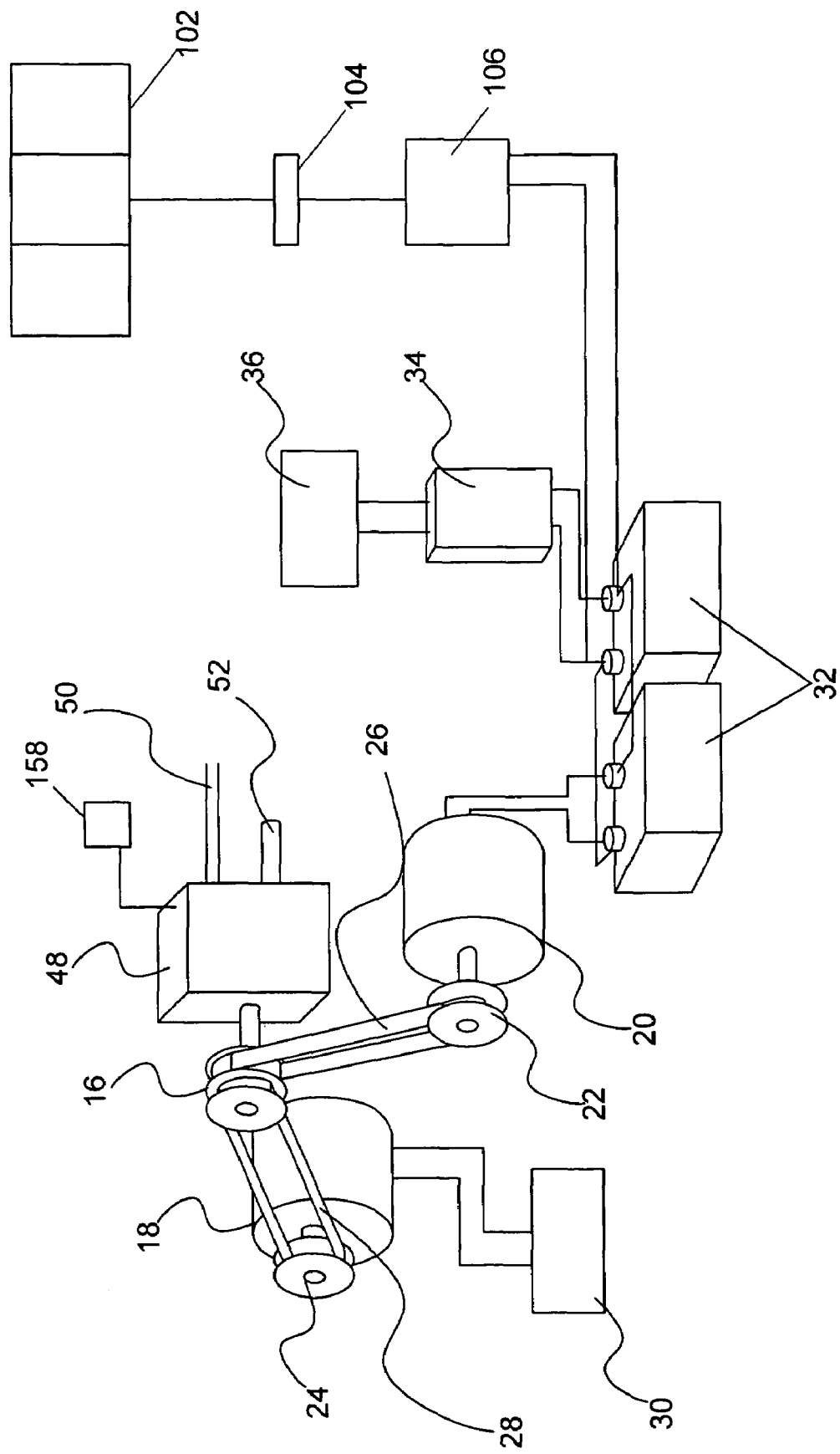
FIG. 3 is a perspective view, showing an alternate embodiment of the present invention.

Yet another embodiment of the present invention is illustrated in FIG. 3. Gas engine 48 is a gas-combustion engine configured to combust liquefied petroleum gas, natural gas, propane or other gaseous fuel source. Gas feed line 50 supplies gas engine 48 with a continuous supply of fuel. If the household is plumbed for natural gas, gas feed line 50 may be plumbed directly to the household's natural gas feed line. Alternatively, an integrated gas tank (such as that used with respect to the portable embodiment illustrated in FIGS. 8 and 9) may be used to supply fuel to gas engine 48. Gas engine 48 exhausts byproducts of the combustion process through exhaust 52. Starter 158 is provided for starting gas engine 48. Gas engine 48 converts combustion energy into the rotation of an output shaft and main pulley 16.

Similar to the embodiment illustrated in FIGS. 1 and 2, generator 18 is operatively connected to main pulley 16 and converts the motion produced by gas engine 48 into an electric current. Belt 28 connects pulley 24 of generator 18 to main pulley 16 so that pulley 24 rotates along with main pulley 16. The electric current produced by generator 18 is used to power high-load circuit 30. As in the previous embodiments, high-load circuit 30 includes high-wattage household loads such as the household's air conditioner and low appliances. Generator 18 is configured to supply high current 110 volt or high current 220 volt power.

Alternator 20 is also operatively connected to gas engine 48. Alternator 20 is configured to convert the motion produced by gas engine 48 into another electric current. Belt 26 connects pulley 22 of alternator 20 to main pulley 16 so that pulley 22 rotates along with main pulley 16. Alternator 20 transmits this electric current to a bank of batteries 32 which stores the charge. Inverter 34 is electrically connected to the bank of batteries 32 and transmits an electric current from the bank of batteries 32 to low-load circuit 36. As in the previous embodiments, low-load circuit 36 includes low-wattage household loads such as televisions, satellite receivers, computers, and lighting. The bank of batteries 32 runs a direct current to inverter 34 producing 110 VAC.

Gas engine 48 (of FIG. 3) and boiler 40 (of FIG. 2) may also be activated by a main switch like the electric motor embodiment illustrated in FIG. 1. The main switch may also be integrated with the household's thermostat so that the main switch is turned on when air-conditioning or heating is needed. When large appliances are not being used, low-load circuit 36 may run off the stored charge in batteries 32.

The embodiment of the invention illustrated in FIG. 3 may be made portable, so that the power distribution system may be transported from one location to another. For example, gas engine 48, generator 18, alternator 20, batteries 32, and inverter 34 may be attached to a common frame. Wheels may be provided on the bottom of the frame for easier transport. Power cords may be provided for connecting high-load and low-load circuits to the unit. For example, one power cord may be electrically connected with the output of generator 18 for supplying high wattage power for high wattage loads. A second power cord may be electrically connected to inverter 34 for providing low wattage power for low wattage loads. Also a remote starter and/or a timer may be used to control gas engine 48 (similar to the embodiment illustrated in FIG. 9). Such a portable power distribution system may have particular utility in providing power for a campsite or other remote location where electric power is otherwise unavailable.

The benefits of the proposed power distribution system are numerous. Those that are skilled in the art know that the proposed power distribution system is easy to retrofit and integrate into the existing power distribution systems of most households. In the electric motor embodiment of FIG. 1, the power distribution system may be integrated to the household through the primary load center. The main power input line to the household may be routed to electric motor 14 through switch 12. The outputs of the power distribution system from generator 18 and inverter 34 may be electrically connected to the appropriate household circuits. The proposed system provides many other benefits including improved generator longevity and efficiency. These benefits are achieved, in part, because the energy coming into the system is being divided into a portion which is used immediately and a portion which is being stored for future use.

In the steam engine embodiment, boiler 40 may be fluidly connected to the household's existing water heater. As such, boiler 40 receives preheated water from the water heater and heats the water further to the boiling point. The gas or electric heating elements of boiler 40 may be powered by the household's main power input line or the household's gas supply line, respectively. The outputs of the power distribution system from generator 18 and inverter 34 may be electrically connected to the appropriate household circuits using a prior art load distribution center.

In the gas engine embodiment, gas engine 48 is supplied fuel by a fuel tank or the household's gas supply line. The outputs of the power distribution system from generator 18 and inverter 34 may be electrically connected to the appropriate household circuits at the junction box.

The proposed power distribution system provides both back-up power and continuous operation power capabilities. The previous description illustrates how the power distribution system may be used for continuous operation. For back-up power applications, the high-load circuit 30 and low-load circuit 36 remain electrically connected to electrical power source 10 so long as power is available. In the electric motor variant, generator 18 may be removed or disconnected from the system so that high-load circuit 30 remains powered by electrical power source 10. As illustrated and described later with respect to FIG. 7, the power distribution system is electrically connected to low-load circuit 36 through a switch. The user may turn the switch to the "on" position when the household is not receiving power from electrical power source 10, such as in a power outage. Batteries 32 then provide back-up power to low-load circuit 36 through inverter 34.

If the gas engine embodiment or the steam engine with gas heating element embodiment is used, the power distribution system may serve a back-up power function for high-load circuit 30 as well. For example, the household may continue to use electric power source 10 to power high-load circuit 30 and low low-load circuit 36 when electric power is available. When electric power is unavailable, however, the user may turn a switch to the "on" position to activated a gas-powered boiler 40 or gas engine 48.

The proposed power distribution system is particularly well-suited for households geographically situated in regions which routinely experience blackouts and brownouts. The energy converting means may operate during non-peak operating times (i.e., times when the community's electrical demands are not as high) in order to store energy for future use during a blackout. It should be noted that the gas engine embodiment and the steam engine with gas heating element embodiment may be operated continuously in these geographic regions. It should be further noted that even the electrical input variant may be used continuously as well. In the event of a power outage, however, the system would be unable to operate high wattage loads. Low-wattage loads, such as the lighting may still be used since these loads obtain their power from energy stored in the bank of batteries.

Figure 4:
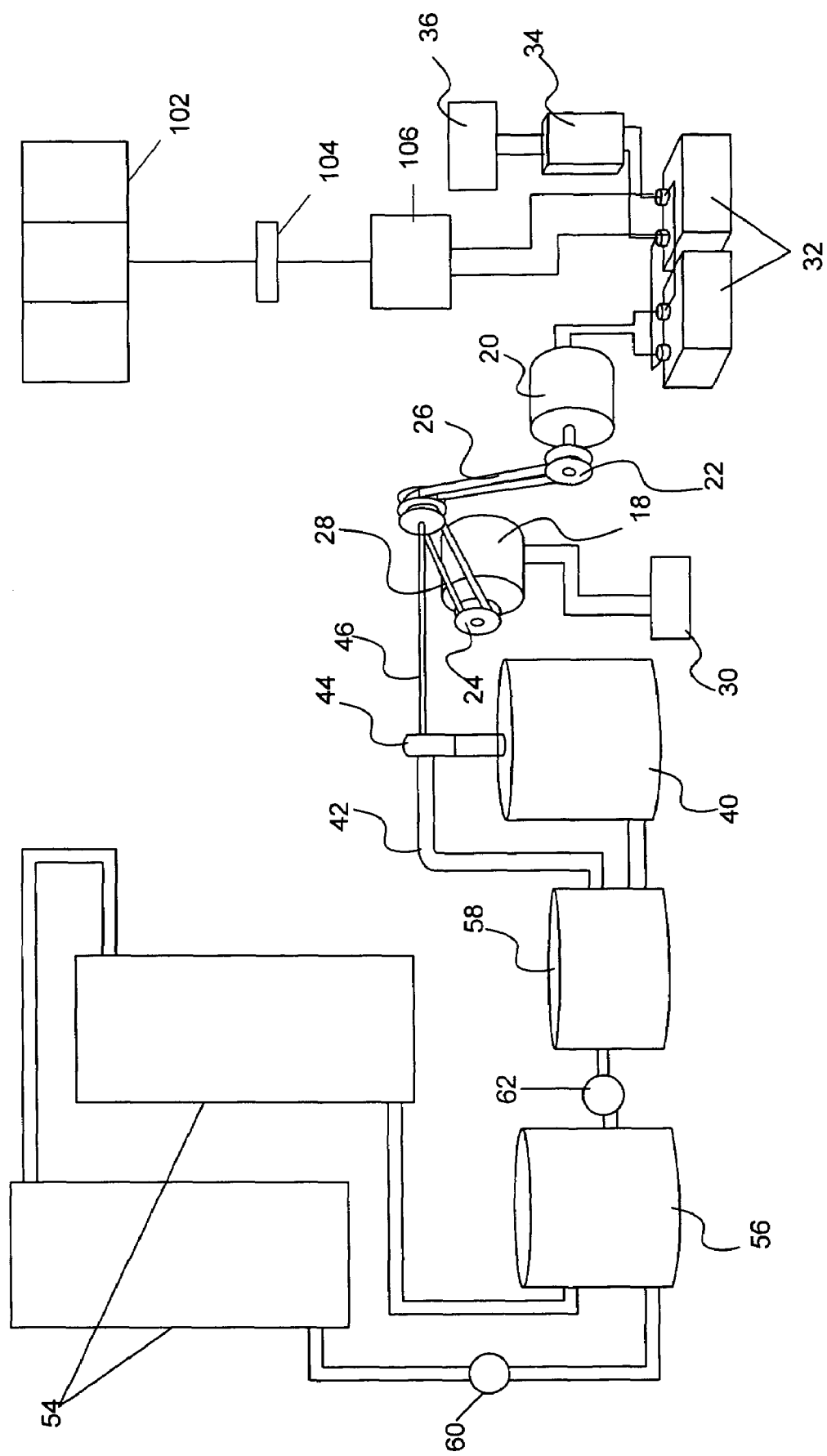
FIG. 4 is a perspective view, showing an alternate embodiment of the present invention.

FIG. 4 illustrates how solar energy may be used to preheat water in the embodiment illustrated in FIG. 2. Solar collectors 54 may be any type of device to collect solar energy. In the present illustration, solar collectors 54 are the type of solar collectors that capture thermal energy. Solar collectors 54 capture direct radiation from the sun and transfer the heat to a transfer fluid. The transfer fluid is preferably water or a water-glycol solution. Solar storage tank 56 is used to hold the transfer fluid once it has been heated. Pump 60 may be used to circulate the transfer fluid through solar collectors 54. Pump 60 may be activated by a controller which observes temperature readings from temperature sensors positioned near solar collectors 54. When the temperature sensors indicate that the temperature is above a certain threshold transfer fluid is circulated through solar collectors 54 and back to solar storage tank 56. Solar storage tank 56 is preferably well insulated to mitigate heat transfer through the storage tank walls.

Pump 62 transfers the fluid from solar storage tank to backup preheater 58. Backup preheater 58 is used to preheat the fluid to a certain temperature before sending the fluid to boiler 40. Backup preheater 58 may be any type of heater or heat exchanger, including gas or electric powered water heaters. Backup preheater 58 may be used as a backup system for heating the fluid during periods when an insuffient amount of solar energy has been collected. This may be necessary during rainy seasons or when the household's energy demands are unusually high.

Figure 5:
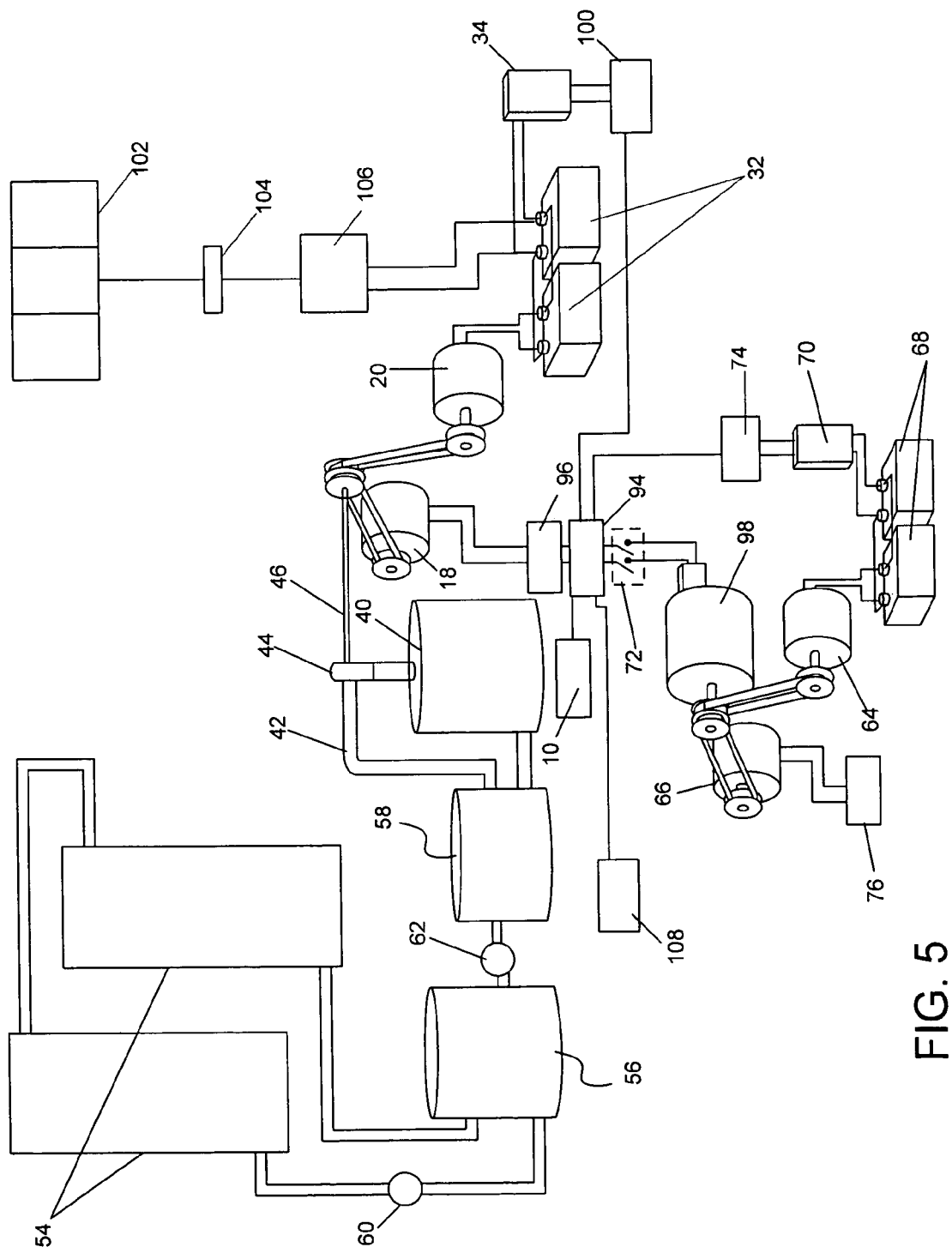
FIG. 5 is a perspective view, showing an alternate embodiment of the present invention.

FIG. 5 illustrates the embodiment of FIG. 4 integrated with other power delivery systems. In the current embodiment, generator 18 provides power to the high load circuits of the household through high load transfer switch 96 and distribution panel 94. Inverter 34 provides power to the household's low load circuits via low load transfer switch 100 and distribution panel 94. Distribution panel 94 may be the household's standard distribution panel which also receives power through electrical power source 10.

Switch 72 may be used to provide power to electric motor 98 from distribution panel 94. Electric motor 98 drives alternator 64 and generator 66. Generator 66 provides electric power to high-load circuit 76. High-load circuit 76 may be used to power high-load appliances of the household (through a transfer switch and distribution panel 94) or may be sold to the power company. Alternator 64 provides direct current to batteries 68. Batteries 68 store power until needed. Inverter 70 is electrically connected to batteries 68 and provides low-wattage AC power to low-load household circuits via low load transfer switch 74 and distribution panel 94. The low wattage power provided by inverter 70 may be used to provide back-up power to the low load circuits supplied with power by inverter 34 or it may provide electric power to a completely separate circuit. Generator 108 may also be connected to distribution panel 94, preferably through a high load transfer switch, to provide backup power to the household in the event of a power outage or if the system breaks down.

The distribution system illustrated in FIG. 5 provides many advantages which would be readily apparent to one that is skilled in the art. For example, switch 72 may be automatically controlled to supply power to electric motor 98 when the household is not otherwise utilizing its high-load circuits. This allows the household to "bank" additional power in batteries 68 and/or sell power to the power company when high-load household appliances are not being used.

Figure 6:
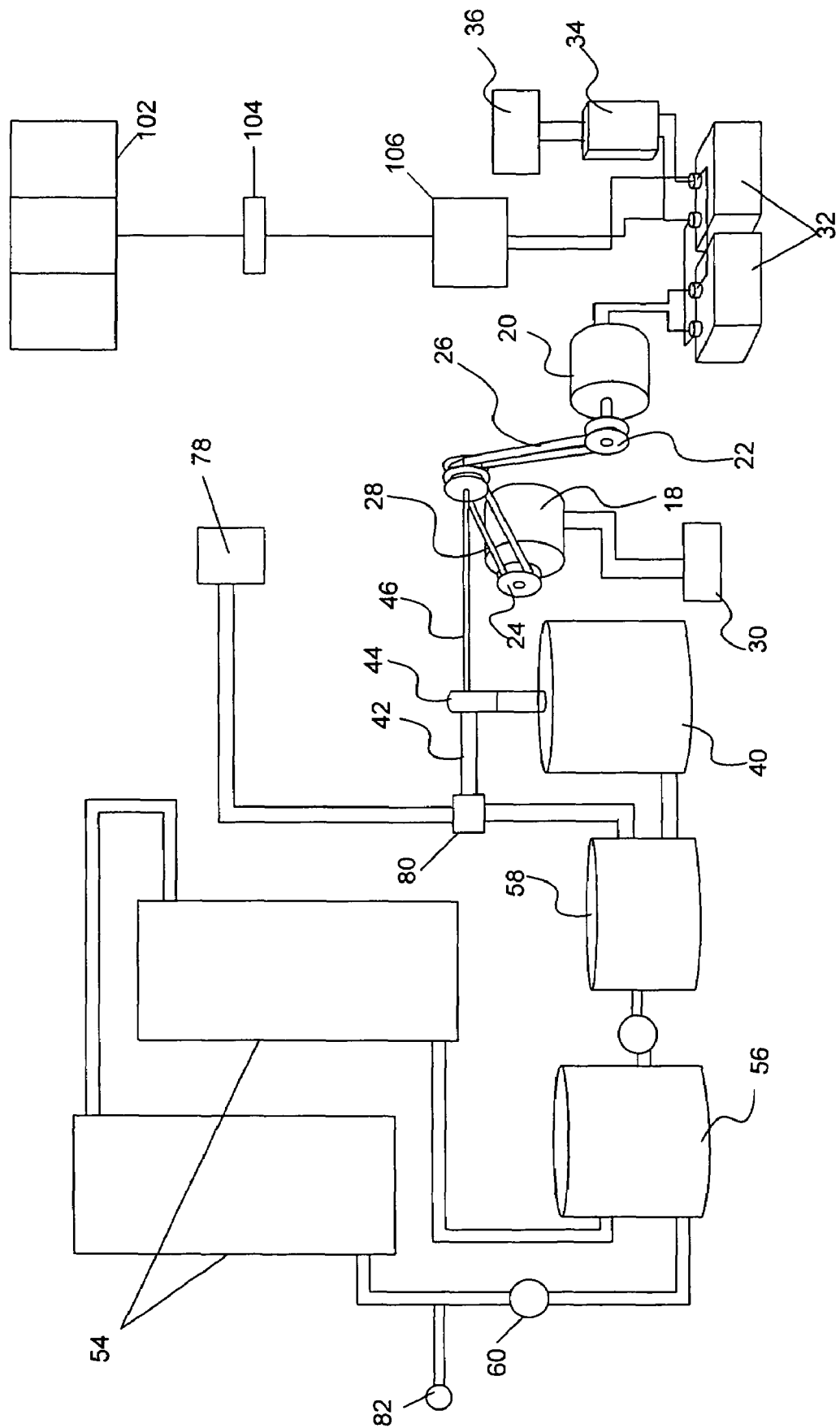
FIG. 6 is a perspective view, showing an alternate embodiment of the present invention.

FIG. 6 illustrates a further improvement of the power distribution systems of FIGS. 4 and 5. In this embodiment, control valve 80 may be actuated to divert the recirculation of water through conduit 42 to heated water circuit 78 where the thermal energy of the fluid may be further harvested. Heated water circuit 78 may include many different appliances and devices which utilize hot water. For example, heated water circuit 78 may direct the heated water to steam cleaners, hot water underfloor heating systems, hot tubs or pools. Control valve 80 may automatically controlled to divert heated water in conduit 42 when hot water is demanded by these systems. When there is no demand for hot water, the hot water may be recirculated back to boiler 40. Water supply 82 provides additional water to the system as needed. If water is not consumed by heated water circuit 78, additional water would only be needed in the event the system developed a leak.

Figure 7:
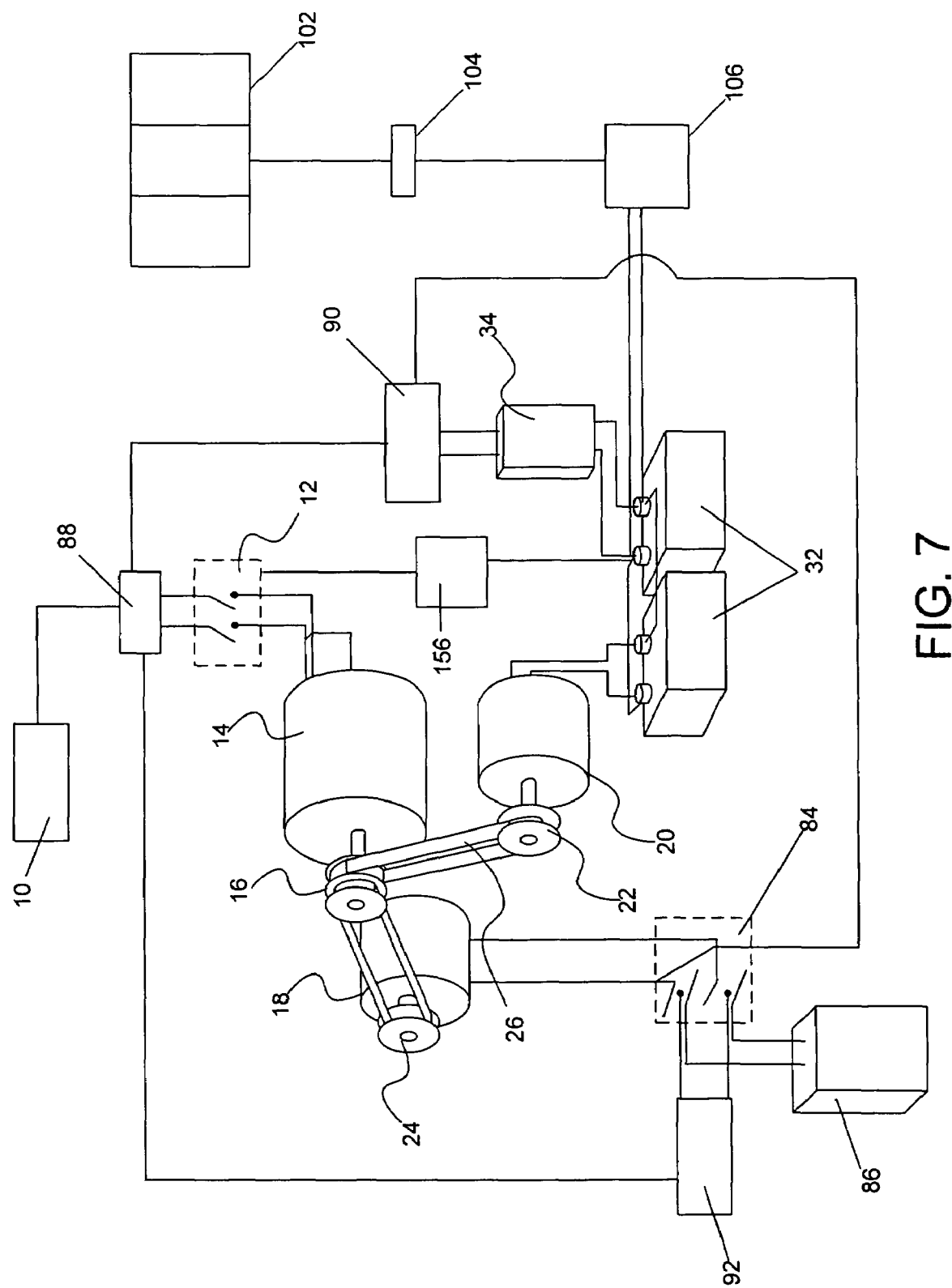
FIG. 7 is a perspective view, showing an alternate embodiment of the present invention.

FIG. 7 illustrates how the proposed distribution system may be electrically integrated into a pre-existing power distribution system. Distribution panel 88 represents a pre-existing distribution panel for a household. Switch 12 allows power to be selectively provided to electric motor 14 which powers a high-load electric circuit (through generator 18 and high load transfer switch 92) and a low-load electric circuit (through alternator 20, batteries 32, inverter 34, and automatic transfer switch 90). Switch 84 is a combination switch which allows the user to connect standalone generator 86 or generator 18 to the high load household circuits via high load transfer switch 92 and distribution panel 88. Switch 84 allows the high load circuits of the household to be powered by standalone generator 86 when distribution panel 88 is not powered by electrical power source 10. Generator 86 may be remotely activated by a remote starter for greater convenience. Generator 86 may also be activated by a thermostat or timer.

Voltage regulator sensor 156 may be electrically connected to batteries 32. When voltage regulator sensor 156 perceives that the batteries have a low charge (i.e., the voltage drops below a defined threshold), voltage regulator sensor 156 may activate electric motor 14 by actuating switch 12. This feature prevents the interruption of power when the user is only utilizing power supplied by batteries 32 and inverter 34. Automatic transfer switch 90 then routes power from generator 18 to the circuits in distribution panel 88 which normally receive power via inverter 34. Furthermore, voltage regulator sensor 156 may also be employed to deactivate electric motor 14 via switch 12 when voltage regulator sensor 156 perceives that the batteries have charged to their capacity (assuming that household is not otherwise using power supplied via generator 18). At that point, automatic transfer switch 90 then would switch power back from generator 18 through inverter 34.

Figure 8:
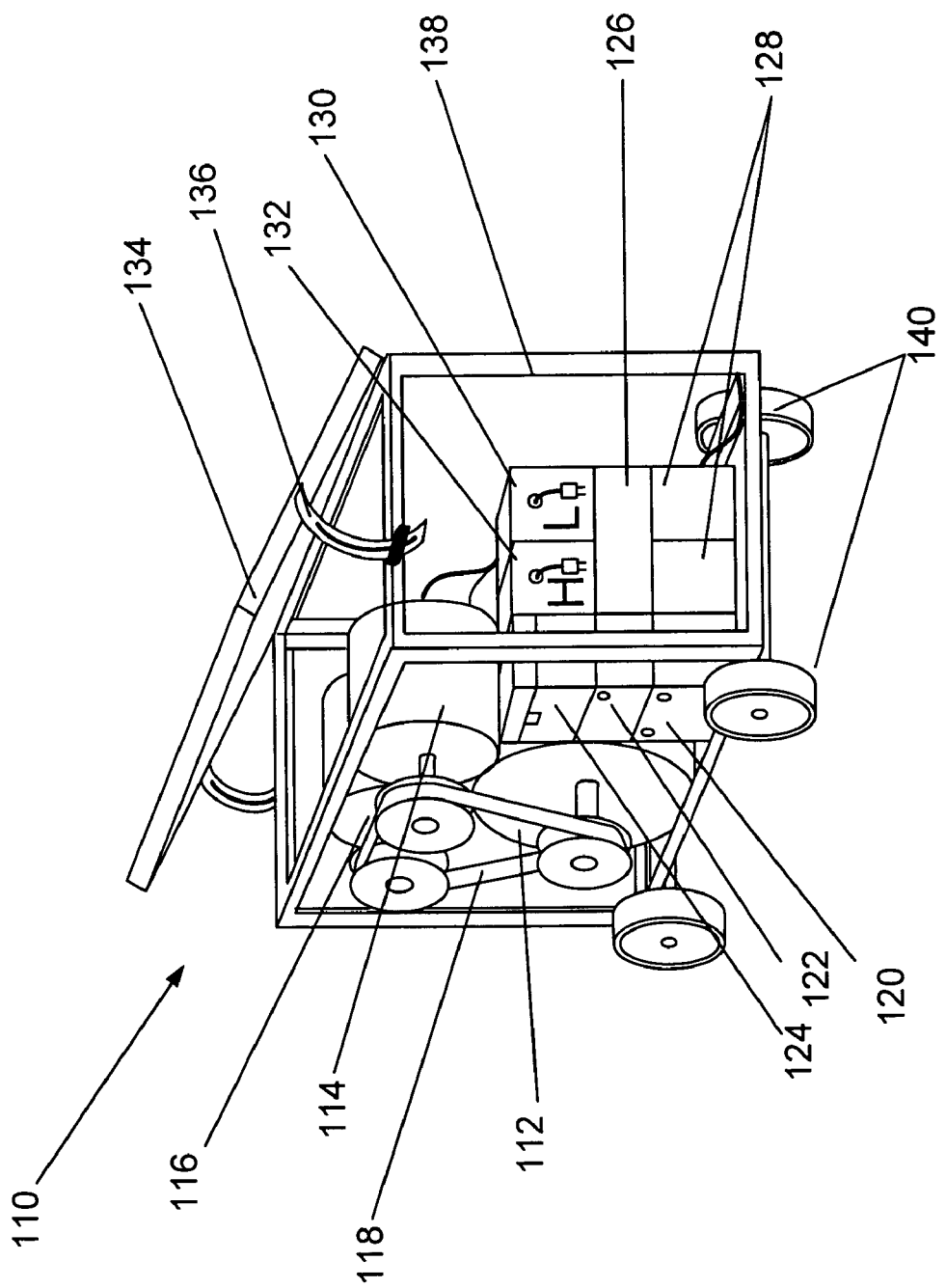
FIG. 8 is a perspective view, showing an alternate embodiment of the present invention.
Figure 9:
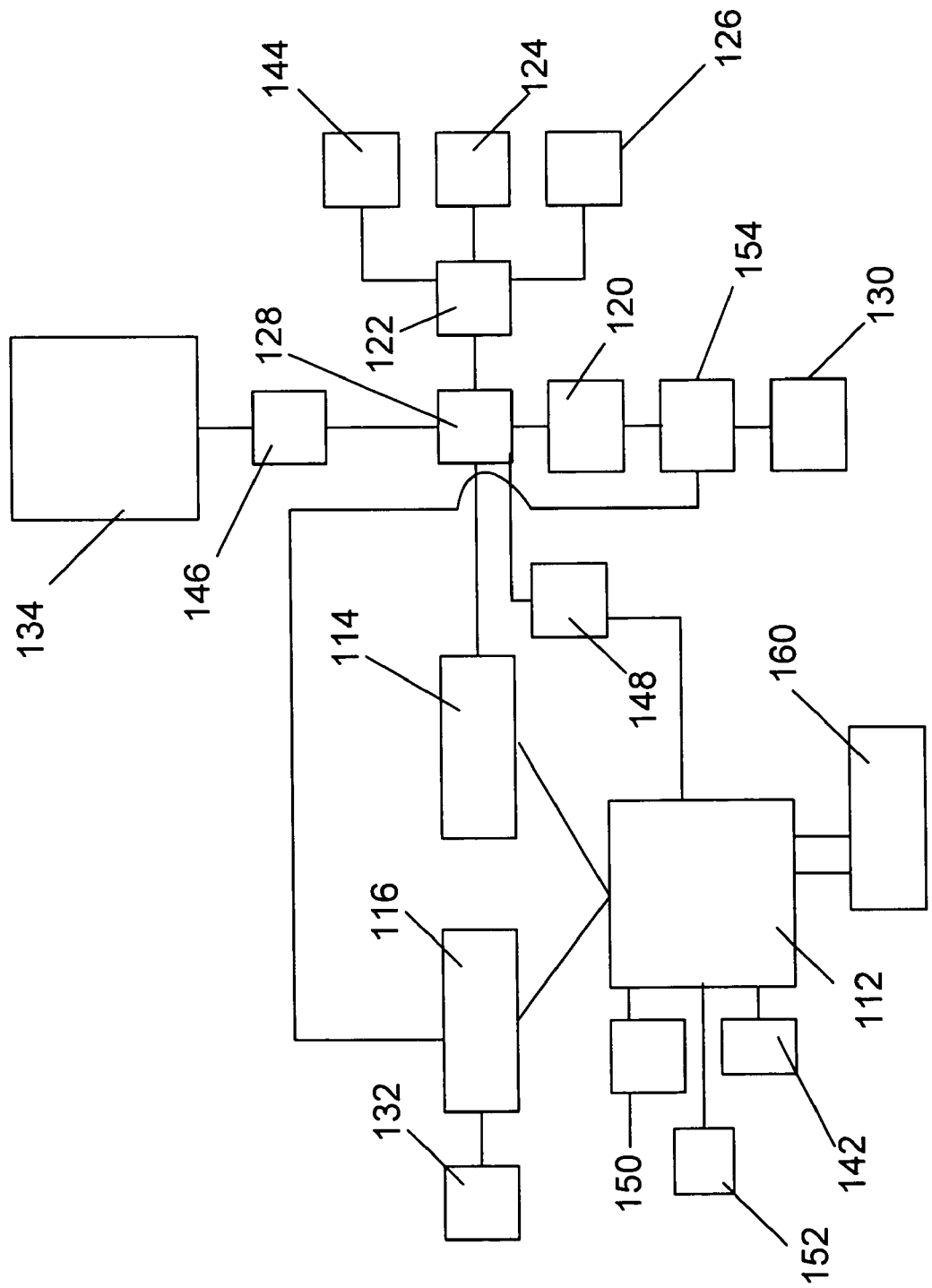
FIG. 9 is a perspective view, showing an alternate embodiment of the present invention.

FIGS. 8 and 9 illustrate a portable embodiment of the present invention. In this embodiment, gas engine 112, alternator 114, inverter 120, batteries 128 and generator 116 are attached within frame 138. Pulleys on alternator 114 and generator 116 are driven by a pulley on gas engine 112 via belt 118. An integrated gas tank (as illustrated in FIG. 9 as fuel tank 160) provides a supply of fuel to gas engine 112. Frame 138 is attached to wheels 140 allowing power distribution system 110 to be easily rolled from one location to another. Tracks, sleds, skis, or other objects suitable for transporting frame 138 across the ground can be used in place wheels 140. Other components for the power distribution system are also attached within frame 138, including DC control panel 122, jumper cable box 124 (which houses a set of jumper cables), air compressor 126, and cord reels 132 and 130. These components will be discussed in greater detail in relation to the schematic provided in FIG. 9.

Referring back to FIG. 8, solar panel 134 is provided on top of frame 138. Level adjustors 136 allow the angle of solar panel 134 to be varied with respect to the ground. This feature allows the user to adjust the angle of solar panel 134 to maximize the solar energy collecting potential of power distribution system 110. Solar panel 134 may also be made to be removable from frame 138 so that that solar panel 134 may be placed at a different location than frame 138.

Although not illustrated herein, a simple suspension system may be provided between wheels 140 and frame 138. In addition, a hitch ball receiver may be attached to one end of frame 138. With the addition of these components, the portable unit may be coupled to an automobile, all-terrain vehicle, snowmobile or other vehicle and towed from one location to another.

As illustrated in FIG. 9, magneto 142 is provided to assist in the startup of gas engine 112. A separate battery may be included to provide start-up power for gas engine 112. As mentioned previously, gas engine 112 mechanically drives generator 116 and alternator 114. Fuel tank 160 supplies fuel to gas engine 112. High wattage AC power produced by generator 116 is provided to cord reel 132. Alternator 114 provides a DC current to batteries 128. Solar panel 134 also supplies batteries 128 DC current via charge controller 146. Batteries 128 supply low wattage AC power to cord reel 130 via inverter 120. DC control panel 122, which is electrically connected to batteries 128 provides DC power to various DC devices including, air compressor 126, jumper cable box 124 and cigarette lighter 144. By now the reader will appreciate that power distribution system 110 meets most of the power supply needs for a group of campers. For example, the jumper cables housed in jumper cable box 124 may be used to jump start an automobile. Air compressor 126 may be used to inflate a flat tire or other inflatable device. Cell phones and similarly adapted devices may be charged using cigarette lighter 144. Finally, cord reel 132 and cord reel 130 may be used to provide high wattage and low wattage AC power as needed.

Automatic actuation is a feature which may be added to any of the embodiments shown or described herein. For example, as shown in FIG. 9, voltage regulator sensor 148 may be electrically connected to batteries 128. When voltage regulator sensor 148 perceives that the batteries have a low charge (i.e., the voltage drops below a defined threshold), voltage regulator sensor 148 may actuate starter 158 which starts engine 112. Automatic transfer switch 154 then routes power from generator 116 to the circuit that normally receives its power from inverter 120 (in the present example, low wattage AC power cord reel 130). This feature prevents the interruption of power when the user is only utilizing power supplied by the batteries and inverter.

Furthermore, the voltage regulator sensor may be employed to deactivate the engine via an on/off switch when the batteries have charged to their capacity. Automatic transfer switch 154 then routes power from inverter 120 to cord reel 130 when the engine is deactivated.

Remote starter 150 may also be used to remotely activate or deactivate engine 112. This feature allows the user of such a system to activate engine 112 without leaving the comforts of his or her tent, cabin, or other building. An integrated timer 152 may be employed to automatically deactivate engine 112 after it has run for a set interval of time. Integrated timer 152 may be further configured to activate engine 112 at various pre-designated times.

The preceding description contains significant detail regarding the novel aspects of the present invention. It should not be construed, however, as limiting the scope of the invention but rather as providing illustrations of the preferred embodiments of the invention. As an example, generator 18 and alternator 20 may be operatively connected to the energy converting means in various ways. For example, gears may be used in place of the pulleys and belts. In addition, the system and switches may be computer controlled so that the user can set certain intervals when the components of the system would be used. Such a variation would not alter the function of the invention.

Furthermore, those that are skilled in the art will recognize that many conventional components may be incorporated into the proposed power distribution systems to improve performance, efficiency, or safety. For example, as illustrated in FIG. 7, solar panel 102 may be used to trickle charge batteries 32 via DC fuse breaker 104 and charge controller 106. This will help maintain the batteries at full charge even when alternator 20 is idle. Also, it may be desirable to employ isolators, voltage regulators and other common electrical components for improved functionality.

The different drawing views are intended to provide examples of how the proposed retrofittable power system may be integrated to a household or other building. Although it is not illustrated in all of the drawing views, it is generally desirable to supply power to the high and low load circuits via transfer switches (such as in the examples illustrated in FIGS. 5 and 7). This allows the power to be supplied to the circuits without feeding power back onto the utility line. Likewise, components shown in the separate drawing views may be incorporated in a common system to combine the functionalities afforded by the various components. For example, a stand alone generator may be used in each system to provide backup power to the household. Also, heated water circuit 78 may be incorporated into the systems illustrated in FIG. 4 or FIG. 5 or in any other system utilizing steam engine 44. The various drawing views are not intended to be exhaustive of the possible configurations of the present invention. Thus, the scope of the invention should be fixed by the following claims, rather than by the examples given.

Having described my invention, I claim:

1. A power distribution and storage system for a household or other building, comprising:
   a. a first means for supplying energy to said power distribution system for an indeterminate period of time;
   b. a second means for converting said energy supplied to said power distribution system into motion;
   c. a generator operatively connected to said second means, said generator configured to convert said motion produced by said second means into a first electric current transmitted to a high-load circuit, wherein said first electric current is a high wattage alternating current;
   d. an alternator operatively connected to said second means, said alternator configured to convert said motion produced by said second means into a second electric current transmitted to a battery, wherein said second electric current is a direct current; and
   e. an inverter electrically connected to said battery, said inverter configured to transform direct current from said second electric current or said battery into a low-wattage alternating current which is then fed to a low-load circuit.

2. The power distribution system of claim 1, said second means further comprising a steam engine, said steam engine configured to convert energy provided by a fluid into motion.

3. The power distribution system of claim 2, said first means comprising a solar collector configured to preheat said fluid before said fluid is transmitted to said steam engine.

4. The power distribution system of claim 3, further comprising a boiler configured to vaporize said fluid after said fluid is preheated by said solar collector.

5. The power distribution system of claim 2, further comprising a boiler configured to vaporize said fluid before transmitting said fluid to said steam engine.

6. The power distribution system of claim 1, wherein said high-load circuit further comprises an air conditioner configured to cool said household.

7. The power distribution system of claim 1, wherein said high-load circuit further comprises high wattage household loads.

8. The power distribution system of claim 1, wherein said low-load circuit further comprises a television.

9. The power distribution system of claim 8, wherein said low-load circuit further comprises low wattage household loads.

10. The power distribution system of claim 1, wherein said low-load circuit further comprises lighting configured to illuminate the interior of said household.

11. The power distribution system of claim 2, wherein said steam engine further comprises a turbine configured to rotate an output shaft.

12. The power distribution system of claim 1, wherein said high-load circuit further comprises an electric motor.

13. The power distribution system of claim 12, wherein said high-load circuit comprises a switch having an on position and an off position, wherein when said switch is in said on position, current is transmitted to said electric motor.

14. The power distribution system of claim 13, wherein said switch is automatically actuated to said on position when said household or building is not otherwise using said high-load circuit to provide power to high-wattage loads.

15. The power distribution system of claim 2, further comprising a conduit configured to transmit said fluid away from said steam engine after said fluid passes through said steam engine.

16. The power distribution system of claim 15, wherein said conduit is configured to recirculate said fluid back to a position upstream of said steam engine.

17. The power distribution system of claim 15, wherein said conduit transmits said fluid to a heated water circuit, wherein said thermal energy of said fluid is further harvested.

18. The power distribution system of claim 15, further comprising:
   a. a conduit configured to transmit said fluid away from said steam engine after said fluid passes through said steam engine;
   b. a control valve downstream of said conduit, said control valve having a first position and a second position;
   c. wherein when said control valve is in said first position, said fluid passing through said conduit is further transmitted to a heated water circuit, said heated water circuit configured to further harvest said thermal energy of said fluid; and
   d. wherein when said control valve is in said second position, said fluid passing through said conduit is recirculated to a position upstream of said steam engine.

19. The power distribution system of claim 1, wherein said second means is actuated by a thermostat.

20. The power distribution system of claim 1, wherein said first means, said second means, said generator, said alternator, and said inverter are attached to a common frame so that said first means, said second means, said generator, and said alternator may be readily transported together from one location to another.

21. The power distribution system of claim 20, further comprising a plurality of wheels operatively attached to said common frame such that said power distribution system can be rolled across the ground.

22. The power distribution system of claim 20, further comprising an automatic actuation means for actuating said second means when the charge of said battery drops below a defined threshold.

23. The power distribution system of claim 1, wherein said power distribution system is configured to simultaneously store a charge in said battery while said generator produces said first electric current.

24. The power distribution system of claim 1, further comprising an automatic actuation means for actuating said second means when the charge of said battery drops below a defined threshold.

25. The power distribution system of claim 1, further comprising a solar panel, said solar panel configured to charge said battery.

26. The power distribution system of claim 2, further comprising
   a. a boiler configured to vaporize said fluid before transmitting said fluid to said steam engine; and
   b. a hot water heater upstream of said boiler, said hot water heater configured to preheat said fluid before transmitting said fluid to said boiler.

27. The power distribution system of claim 24, further comprising an automatic deactivation means for deactivating said second means after said batteries have charged.

28. The power distribution system of claim 1, further comprising an automatic transfer switch configured to transfer power from said generator to said low load circuit.

29. The power distribution system of claim 24, further comprising an automatic transfer switch configured to transfer power from said generator to said low load circuit after said automated actuation means actuates said second means.

30. The power distribution system of claim 1, further comprising a remote starter, said remote starter configured to permit actuation of said second means from a location remote to said second means.

31. The power distribution system of claim 20, further comprising a remote starter, said remote starter configured to permit actuation of said second means from a location remote to said second means.

32. The power distribution system of claim 31, further comprising a timer, said timer configured to deactivate said second means after said second means runs for a designated interval of time.

33. The power distribution system of claim 20, further comprising a set of jumper cables, said jumper cables configured to electrically connect to said battery.

34. The power distribution system of claim 20, further comprising a DC control panel electrically connected to said battery, said DC control panel configured to supply direct current to a DC-powered device from said battery.

35. The power distribution system of claim 20, wherein said battery and said inverter are attached to said common frame.

36. The power distribution system of claim 32, wherein said timer is further configured to activate said second means at a pre-designated time.

\* \* \* \* \*